Patented Feb. 6, 1934

1,945,998

UNITED STATES PATENT OFFICE 1,945,998

COATING COMPOSITION

Erik Rotheim, Oslo, Norway

No Drawing. Original application November 12, 1928, Serial No. 318,878, and in Norway October 8, 1926. Divided and this application April 20, 1932. Serial No. 606,469

5 Claims. (Cl. 134—79)

This application is a division of my former application Serial No. 318,878 filed November 12, 1928 for Method and apparatus for atomizing materials, which latter application is a division of my earlier application Serial No. 223,143 filed September 30, 1927 now Patent No. 1,800,156 for Method and means for atomizing or distribution of liquid or similiquid materials.

The present invention relates to coating compositions of the type containing nonvolatile solid or liquid substances adapted to form a lasting layer on surfaces of objects of various kinds and has for its object a composition of this character, which is so prepared as to be able of being readily converted into a spray.

An important feature of the present composition consists therein that it contains a substantial proportion of a gaseous nonoxygenous hydrocarbon compound in a liquefied condition. The said gaseous hydrocarbon compound should be present in a quantity which is in excess of that which dissolves in the composition at ordinary temperature under atmospheric pressure.

In order that the hydrocarbon compound shall not evaporate before the time when the composition is to be applied, the composition is stored under a pressure which is sufficiently high to maintain the gas in a liquefied condition. The containers employed for keeping the composition should therefore be able to resist high pressure and to be hermetically sealed.

When a coating composition prepared in accordance with the present invention is ejected through a suitable nozzle from a closed vessel containing same, the dissolved gas will evaporate and will cause the composition to be converted into a dispersion of fine particles of nongaseous material containing the coating constituents of the composition. These particles will be dispersed in a flowing gas comprising the evaporated gaseous component of the composition. The size of the particles of the so produced dispersion will in part depend upon the consistency of the non-gaseous constituents of the composition, but can to a great deal be varied at will by lessening or increasing the proportion of gas dissolved in the composition or by choosing the gaseous constituent or constituents with this particular object in view.

As examples of gaseous hydrocarbon compounds suitable as constituents of the organism destroying composition according to the invention are to be mentioned: Methyl chloride ($CH_3Cl$), Isabutane and other gaseous hydrocarbons with condensation pressure below 40 atmospheres (for ex. Rhigolene and Cymogene), Vinyl chloride (Methylene chloride).

These substances are all gaseous at ordinary temperatures and pressure but condensible at comparatively low pressures and are when in a condensed condition able to dissolve the constituents of the common coating composition of the type hereinbefore referred to (for example paints, lacquers, varnishes, floor waxes, impregnation means, lubricants, booth greases and polishes, leather blackings etc.).

The invention may be used in connection with any type of coating compositions whether they are of the water soluble type or of the type having oils, alcohol or other liquid as a vehicle.

Owing to the character of the gaseous hydrocarbon compounds above referred to the coating composition prepared in accordance with the invention may contain substances of various kinds, such as for example mineral and fatty oils, fats, soaps, resins, paraffines, waxes, dyes, cellulose compounds, rubber, gum, glue, etc.

It is thus possible to prepare the coating compositions so as to suit every conceivable condition of use.

By suitable choice of gaseous hydrocarbon compounds the invention can be applied without difficulty to any type of coating material. As regards the various components of coating composition and the proportions in which same are to be used, it will be sufficient to refer to the literature of this particular art, such for example as Chemisch-technische Vorschriften by Dr. Otto Lang (Leipzig 1920), Ullmann's Enzyklopädie der technischen Chemie, Seeligmann and Zieke: Handbuch der Lack- und Firnis-Industrie (Berlin).

As is known from the literature in question the plurality of the substances employed as constituents or vehicles of coating compositions such as waxes, oils, cellulose esters etc. are not soluble in water to any high degree and are therefore employed as solutions in nonaqueous vehicles such as petroleum distillates and other liquid organic solvents. As a matter of course the present invention is readily applicable to this type of compositions because the gaseous hydrocarbon compounds above referred to are all readily soluble in petroleum distillates and other nonaqueous solvents.

In case of the application of the invention to compositions in which the substances effective to produce the coating are dissolved in water or aqueous liquids a gaseous hydrocarbon compound soluble in water such as methyl chloride is made use of as an addition. In other instances, however, where the vehicle is a liquid hydrocarbon or other nonaqueous organic solvent anyone of the above mentioned gaseous hydrocarbon compounds (comprising also the hydrocarbons themselves for example isobutane etc.) or mixtures of same can be made use of.

In cases where it is desirable to reduce the inflammability of the composition it may be advisable to add some non-combustible volatile substance, such as for example carbon tetrachloride or other highly halogenated hydrocarbon.

The quantity of gaseous hydrocarbon compound to be introduced into the coating composition in order to obtain the results aimed at according to the present invention will be dependent upon the character of the composition as well as on the conditions of use and will in most cases be less than 50 per cent and more than 5 per cent. In a cellulose lacquer consisting of some cellulose ester dissolved in a cellulose ester solvent (for example amyl acetate), a suitable proportion may for example be about 20 per cent by weight of methyl chloride, or isobutane. Satisfactory results may, however, be attained also in this instance by comparatively small quantities of the gaseous constituent, for example as low as between 5 and 10 per cent.

A container suitable for storing coating compositions of the character hereinbefore referred to is illustrated in my Patent No. 1,800,156.

Instead of using a mixture of the material with the condensed gas (or gases) the condensed gas can also be placed in small containers which are inserted in or connected with the container for the material to be distributed.

I claim:

1. Coating composition comprising a non-volatile coating material and a liquefied gaseous compound containing a hydrocarbon radical dissolved in the material in a quantity sufficient to produce a solution saturated with the gaseous compound at a pressure of several atmospheres at ordinary temperature, the said composition being maintained under pressure in a confined space.

2. Coating composition comprising a substance adapted to form a layer on the surface of objects and a liquid vehicle comprising a hydrocarbon compound liquid at ordinary temperature and a liquefied hydrocarbon compound which is a gas under atmospheric pressure at ordinary temperature dissolved in the material in a quantity sufficient to produce a solution saturated with the hydrocarbon gas at a pressure of several atmospheres at ordinary temperature, the said composition being maintained under pressure in a confined space.

3. Coating composition comprising a non-volatile coating material and a liquefied gas, comprising a hydrocarbon compound dissolved in the material in a quantity sufficient to saturate the material at a pressure in excess of 3 atmospheres at ordinary temperature, the said composition being maintained under pressure in a confined space.

4. Coating composition consisting of a coating material dissolved in a liquid vehicle comprising a liquefied hydrocarbon, which is a gas at ordinary temperature under atmospheric pressure, dissolved in the composition in a quantity in excess of that required to saturate the composition with the gas at ordinary conditions of temperature and pressure.

5. Coating composition comprising a cellulose compound and liquid vehicle comprising a liquefied hydrocarbon compound which is a gas at ordinary temperature under atmospheric pressure dissolved in the composition in a quantity in excess of that which is soluble in the composition under ordinary conditions being maintained under pressure in a confined space.

ERIK ROTHEIM.